US012785055B2

(12) United States Patent
Mitsui et al.

(10) Patent No.: US 12,785,055 B2
(45) Date of Patent: Nov. 3, 2026

(54) MASS SPECTROMETER AND MASS SPECTROMETRY METHOD

(71) Applicant: SHIMADZU CORPORATION, Kyoto (JP)

(72) Inventors: Kazutaka Mitsui, Kyoto (JP); Hidenori Takahashi, Kyoto (JP); Yuta Miyazaki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 297 days.

(21) Appl. No.: 18/579,781

(22) PCT Filed: Mar. 25, 2022

(86) PCT No.: PCT/JP2022/014580
§ 371 (c)(1),
(2) Date: Jan. 16, 2024

(87) PCT Pub. No.: WO2023/002712
PCT Pub. Date: Jan. 26, 2023

(65) Prior Publication Data

US 2024/0242954 A1 Jul. 18, 2024

(30) Foreign Application Priority Data

Jul. 21, 2021 (JP) ................................ 2021-121017

(51) Int. Cl.
*H01J 49/10* (2006.01)
*H01J 49/00* (2006.01)
*H01J 49/02* (2006.01)

(52) U.S. Cl.
CPC ........ *H01J 49/105* (2013.01); *H01J 49/0031* (2013.01); *H01J 49/025* (2013.01)

(58) Field of Classification Search
CPC .... H01J 49/105; H01J 49/0031; H01J 49/025; H01J 49/0045; H05H 1/46; G01N 27/62
See application file for complete search history.

(56) References Cited

U.S. PATENT DOCUMENTS 3,868,222 A * 2/1975 Barringer ........... G01N 15/0618 73/863.25
5,939,718 A * 8/1999 Yamada ................ H01J 49/063 250/288
(Continued)

FOREIGN PATENT DOCUMENTS

CN 107533008 A * 1/2018 ............. G01N 21/01
GB 2432454 A * 5/2007 .............. H01J 49/10
(Continued)

OTHER PUBLICATIONS

First Office Action dated Aug. 13, 2024 issued for the corresponding Japanese Patent Application No. 2023-536618.
(Continued)

*Primary Examiner* — David A Vanore
(74) *Attorney, Agent, or Firm* — Muir Patent Law, PLLC

(57) ABSTRACT

A mass spectrometry method in which a precursor ion is introduced into a reaction chamber (step 2), a radical is generated in a radical generation chamber, the precursor ion is irradiated with the radical to generate a product ion (step 15), and a mass of the product ion is measured (step 16) includes, when generating the radical, introducing a material gas into the radical generation chamber (steps 5 and 8), supplying radio-frequency power to the material gas simultaneously with or after introducing the precursor ion into the reaction chamber (steps 5 and 8), and supplying an electron to the material gas in a state where the radio-frequency power is supplied to generate plasma emission, and irradiating the material gas with the plasma emission to generate the radical (steps 6 and 9).

8 Claims, 5 Drawing Sheets

(56) References Cited

U.S. PATENT DOCUMENTS

| | | | | |
|---|---|---|---|---|
| 5,986,757 | A * | 11/1999 | Seltzer | G01N 21/73 356/318 |
| 6,291,823 | B1 * | 9/2001 | Doyle | H01J 37/26 250/306 |
| 11,996,276 | B2 * | 5/2024 | Chen | H01J 37/3266 |
| 2007/0193517 | A1 | 8/2007 | Matsuuchi et al. | |
| 2011/0260732 | A1 * | 10/2011 | Shinada | G01N 27/62 324/464 |
| 2011/0293854 | A1 | 12/2011 | Takizawa | |
| 2014/0246576 | A1 * | 9/2014 | Gilbert | H01J 49/0036 250/281 |
| 2016/0372311 | A1 | 12/2016 | Takahashi et al. | |
| 2020/0111654 | A1 | 4/2020 | Takahashi et al. | |
| 2021/0050198 | A1 * | 2/2021 | Takahashi | H01J 49/40 |
| 2022/0230861 | A1 * | 7/2022 | Takahashi | H01J 49/0045 |
| 2023/0048972 | A1 * | 2/2023 | Takahashi | G01N 27/626 |
| 2023/0386814 | A1 * | 11/2023 | Furuta | H01J 49/0045 |
| 2024/0030016 | A1 * | 1/2024 | Takahashi | H01J 49/005 |
| 2024/0038515 | A1 * | 2/2024 | Mitsui | H01J 49/025 |
| 2024/0177980 | A1 * | 5/2024 | Takahashi | G01N 27/62 |
| 2024/0242954 | A1 * | 7/2024 | Mitsui | H01J 49/025 |
| 2024/0242957 | A1 * | 7/2024 | Miyazaki | H01J 49/022 |
| 2025/0285851 | A1 * | 9/2025 | Arao | H01J 49/005 |

FOREIGN PATENT DOCUMENTS

| | | | | |
|---|---|---|---|---|
| JP | H0992200 | A * | 4/1997 | |
| JP | H10-172793 | A | 6/1998 | |
| JP | 2889930 | B2 * | 5/1999 | |
| JP | 2013524467 | A * | 6/2013 | H01J 37/3056 |
| JP | 2020-177784 | A | 10/2020 | |
| JP | 7109026 | B2 * | 7/2022 | H01J 49/0045 |
| JP | 2022127550 | A * | 8/2022 | H05H 1/02 |
| WO | 2015/133259 | A1 | 9/2015 | |
| WO | 2018/186286 | A1 | 10/2018 | |
| WO | WO-2019155725 | A1 * | 8/2019 | G01N 27/623 |
| WO | 2020/240908 | A1 | 12/2020 | |

OTHER PUBLICATIONS

Ding et al., "Defectrelated photoluminescence emission from annealed ZnO films deposited on AlN substrates", Materials Research Bulletin 95 (2017), pp. 185-189.
Kitabayashi et al., "Charging Characteristics between Insulators and Glass", Journal of The Institute of Electrostatics Japan 27, 5, (2003), pp. 240-245.
Kitabayashi et al., "Charging of Insulating Glass Caused by Contact with Plates", IEEJ Transactions on Fundamentals and Materials, vol. 125, 2005, No. 2, pp. 179-184.
Takahashi et al., "Identifying Double Bond Positions in Phospholipids Using Liquid Chromatography—Triple Quadrupole Tandem Mass Spectrometry Based on Oxygen Attachment Dissociation", Mass Spectrometry, vol. 8, Issue 2, all pages (16), 2020.
Written Opinion of the International Searching Authority (ISA237) for PCT application No. PCT/JP2022/014580 dated May 17, 2022.
Extended European Search Report dated Oct. 10, 2024 issued for the corresponding European Patent Application No. 22845651.3.
Shimabukuro Yuji et al: "Microwave excitation of a low-energy atomic hydrogen", Plasma Sources Science and Technology, vol. 29, No. 1, Jan. 31, 2020 (Jan. 31, 2020), p. 015005, XP093123735.
First Office Action dated Mar. 18, 2026 issued for the corresponding Chinese Patent Application No. 202280046689.4.
Decision of Rejection dated Jul. 14, 2026 issued for the corresponding Chinese Patent Application No. 202280046689.4.

* cited by examiner

Fig. 5

| MFC FLOW RATE (sccm) | FIRST TIME | SECOND TIME | THIRD TIME |
|---|---|---|---|
| COMPARATIVE EXAMPLE (NO LIGHT EMISSION) | NO LIGHTING | 0.5 | 0.32 |
| FIRST EXAMPLE (EMISSION AT 275 nm) | 0.24 | 0.1 | 0.2 |
| SECOND EXAMPLE (EMISSION AT 250 nm) | 0.32 | 0.1 | 0.2 |

MASS SPECTROMETER AND MASS SPECTROMETRY METHOD

TECHNICAL FIELD

The present invention relates to a mass spectrometer and a mass spectrometry method.

BACKGROUND ART

A mass spectrometry method is widely used in order to identify a polymer compound component in a sample and analyze its structure, in which an ion having a specific mass-to-charge ratio is selected as a precursor ion from ions derived from a sample component, and product ions generated by dissociating the precursor ion are separated according to their mass-to-charge ratios, and detected.

Many of polymer compounds are organic substances having a hydrocarbon chain as a main skeleton. In order to learn the characteristics of such a polymer compound, it is effective to obtain information such as the presence or absence of an unsaturated bond between carbon atoms and the presence or absence of a characteristic functional group. Therefore, recently, a radical attachment dissociation method has been proposed in which radicals are attached to precursor ions derived from a sample component to dissociate the precursor ions at the position of unsaturated bonds between carbon atoms or of specific functional groups.

For example, Patent Literatures 1 and 2 disclose that hydrogen radicals or the like are attached to precursor ions introduced into a reaction chamber by irradiating the precursor ions with the hydrogen radicals to selectively dissociate the precursor ions at the position of peptide bonds. Patent Literatures 3 and 4 disclose that oxygen radicals or the like are attached to precursor ions introduced into a reaction chamber by irradiating the precursor ions with the oxygen radicals to selectively dissociate the precursor ions at the position of unsaturated bonds contained in hydrocarbon chains.

Radicals used in the radical attachment dissociation method are generated, for example, by generating inductively coupled plasma in a radical generation chamber into which a material gas is introduced. Patent Literature 5 and Non Patent Literature 1 describe a radical supply part having a configuration in which a helical antenna is wound around the outer periphery of a tubular body made of a dielectric material such as quartz, a material gas is introduced into the tubular body, radio-frequency power is supplied to the antenna to generate inductively coupled plasma and generate radicals, and the radicals are transported to a reaction chamber through a transport pipe.

CITATION LIST

Patent Literature

Patent Literature 1: WO 2015/133259 A
Patent Literature 2: WO 2018/186286 A
Patent Literature 3: WO 2019/155725 A
Patent Literature 4: WO 2020/240908 A
Patent Literature 5: JP 2020-177784 A

Non Patent Literature

Non Patent Literature 1: Hidenori Takahashi, Yuji Shimabukuro, Daiki Asakawa, Akihito Korenaga, Masaki Yamada, Shinichi Iwamoto, Motoi Wada, Koichi Tanaka, "Identifying Double Bond Positions in Phospholipids Using Liquid Chromatography-Triple Quadrupole Tandem Mass Spectrometry Based on Oxygen Attachment Dissociation", Mass Spectrometry, Volume 8, Issue 2, Pages S0080, 2020
Non Patent Literature 2: Hiroyoshi Kitabayashi, Haruhisa Fujii, "Charging of Insulating Glass Caused by Contact with Plates", IEEJ Transactions on Fundamentals and Materials, Volume 125, 2005, No. 2
Non Patent Literature 3: Jijun Ding, Haixia Chen, Haiwei Fu, "Defect-related photoluminescence emission from annealed ZnO films deposited on AlN substrates", Materials Research Bulletin 95 (2017) 185-189
Non Patent Literature 4: Hiroyoshi Kitabayashi, Haruhisa Fujii, "Charging Characteristics between Insulators and Glass", Journal of The Institute of Electrostatics Japan 27, 5, (2003), pp. 240-245

SUMMARY OF INVENTION

Technical Problem

In the above-described radical supply part, supplying a material gas at a predetermined flow rate and inputting radio-frequency power of a predetermined magnitude do not always generate plasma at a fixed timing. It is difficult to control the timing of generating plasma. Thus, conventionally, before starting analysis of a sample, plasma is generated in a state where a valve provided in a transport pipe is closed, and radicals are irradiated on precursor ions by opening the valve at a timing at which the precursor ions are introduced into a reaction chamber. As described above, the material gas is continuously supplied and the radio-frequency power is continuously supplied for a longer time than a time during which the precursor ions are actually irradiated with the radicals. This causes a problem in that the consumption of the material gas and the power increases.

A problem to be solved by the present invention is to provide a technique that allows for reduction of the consumption of a material gas and power at the time of generating radicals from the material gas, and irradiating precursor ions with the radicals to generate product ions.

Solution to Problem

A mass spectrometry method according to the present invention made to solve the above problem includes:

- a step of introducing a precursor ion into a reaction chamber;
- a step of generating a radical in a radical generation chamber;
- a step of generating a product ion by irradiating the precursor ion in the reaction chamber with the radical; and
- a step of measuring a mass of the product ion, the step of generating a radical including:

- a step of introducing a material gas into the radical generation chamber;
- a step of supplying radio-frequency power to the material gas simultaneously with or after introducing the precursor ion into the reaction chamber; and
- a step of supplying an electron to the material gas in a state where the radio-frequency power is supplied to generate plasma emission, and irradiating the material gas with the plasma emission to generate the radical.

In addition, a mass spectrometer according to the present invention made to solve the above problem includes:

- a reaction chamber into which a precursor ion is introduced;
- a radical generation chamber;
- a material gas supply part configured to supply a material gas into the radical generation chamber;
- a radio-frequency power supply part configured to supply radio-frequency power for generating plasma inside the radical generation chamber;
- an electron supply part configured to supply an electron into the radical generation chamber; and
- a control part configured to control operations of the material gas supply part, the radio-frequency power supply part, and the electron supply part so as to supply the material gas to the radical generation chamber, supply the radio-frequency power simultaneously with or after introducing a precursor ion into the reaction chamber, and supply the electron from the electron supply part into the radical generation chamber in a state where the radio-frequency power is supplied.

Advantageous Effects of Invention

The mass spectrometry method and the mass spectrometer according to the present invention are used for irradiating the precursor ion introduced into the reaction chamber with the radical to generate product ions from the precursor ion. In the present invention, the material gas is introduced into the radical generation chamber, the radio-frequency power is supplied, and the electron is further supplied to the material gas in the radical generation chamber to generate the plasma emission. When the electron is supplied to the material gas in the radical generation chamber, the plasma emission is immediately generated by being induced by the electron. As described above, in the present invention, the plasma emission is generated in accordance with the timing at which the precursor ion is introduced into the reaction chamber to generate the radical. This makes it possible to reduce the consumption of the material gas and the power.

BRIEF DESCRIPTION OF DRAWINGS

FIG. 5 shows a result of measuring plasma generation conditions using the mass spectrometer of the present embodiment.

DESCRIPTION OF EMBODIMENTS

Hereinafter, an embodiment of a mass spectrometer and a mass spectrometry method according to the present invention will be described with reference to the drawings.

Figure 1:
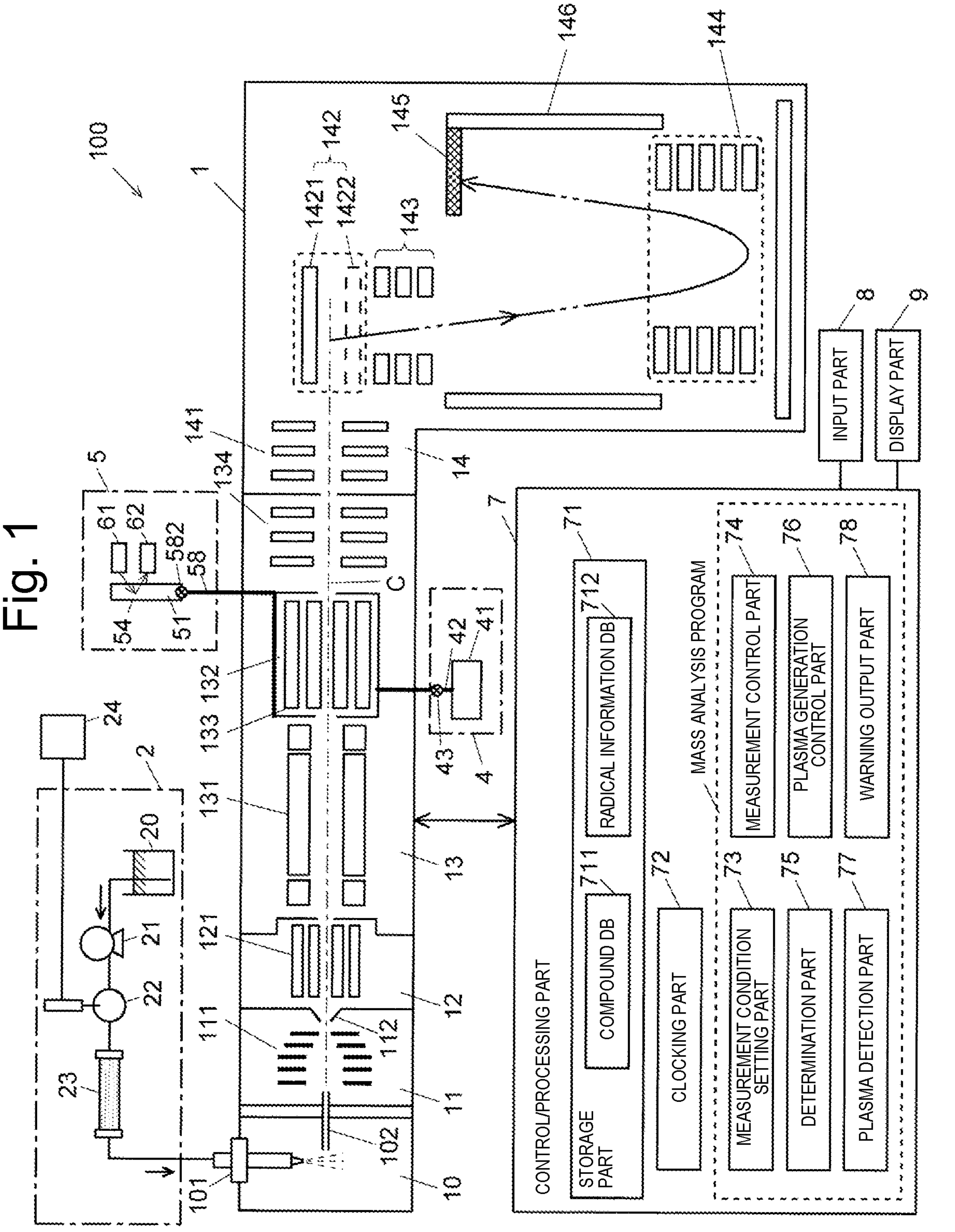
FIG. 1 is a configuration diagram of a main part of an embodiment of a mass spectrometer according to the present invention.

FIG. 1 is a configuration diagram of a main part of a liquid chromatograph mass spectrometer 100 in which a mass spectrometer 1 of the present embodiment is combined with a liquid chromatograph 2.

The liquid chromatograph 2 includes a mobile phase container 20 that stores a mobile phase, a liquid feeding pump 21 that feeds the mobile phase, an injector 22, and a column 23. In addition, to the injector 22, an autosampler 24 that introduces a plurality of liquid samples into the injector in a predetermined order is connected.

The mass spectrometer 1 includes a main body including an ionization chamber 10 at substantially atmospheric pressure and a vacuum chamber, and a control/processing part 7. The vacuum chamber includes a first intermediate vacuum chamber 11, a second intermediate vacuum chamber 12, a third intermediate vacuum chamber 13, and an analysis chamber 14 in this order from the ionization chamber 10, and has a configuration of a multi-stage differential exhaust system with an increasing degree of vacuum in this order.

The ionization chamber 10 is provided with an electrospray ionization probe (ESI probe) 101 for nebulizing a liquid sample while imparting electric charges to the liquid sample. Sample components separated in the column 23 of the liquid chromatograph 2 are sequentially introduced into the ESI probe 101.

The ionization chamber 10 and the first intermediate vacuum chamber 11 communicate with each other through a small-diameter heated capillary 102. In the first intermediate vacuum chamber 11, an ion lens 111 is disposed that includes a plurality of ring-shaped electrodes having different diameters and focuses ions in the vicinity of an ion optical axis C that is a central axis of a flight path of ions.

The first intermediate vacuum chamber 11 and the second intermediate vacuum chamber 12 are separated from each other by a skimmer 112 having a small hole at its top. In the second intermediate vacuum chamber 12, an ion guide 121 is disposed that includes a plurality of rod electrodes disposed so as to surround the ion optical axis C and focuses ions in the vicinity of the ion optical axis C.

In the third intermediate vacuum chamber 13, there are disposed: a quadrupole mass filter 131 to separate ions according to their mass-to-charge ratios; a collision cell 132 including a multipole ion guide 133 inside; and an ion guide 134 to transport ions discharged from the collision cell 132. The ion guide 134 includes a plurality of ring-shaped electrodes having the same diameter.

A collision gas supply part 4 is connected to the collision cell 132. The collision gas supply part 4 includes: a collision gas source 41; a gas introduction flow path 42 for introducing gas from the collision gas source 41 into the collision cell 132; and a valve 43 for opening and closing the gas introduction flow path 42. As the collision gas, for example, an inert gas such as a nitrogen gas or an argon gas is used. In a measurement example to be described later in which a precursor ion is dissociated by a radical attachment reaction, no collision gas is used, but measurement is performed in which a compound contained in the same liquid sample is cleaved by collision-induced dissociation (CID), so that information on a product ion having a molecular structure different from that of a product ion generated by the radical attachment reaction can be collected.

Figure 2:
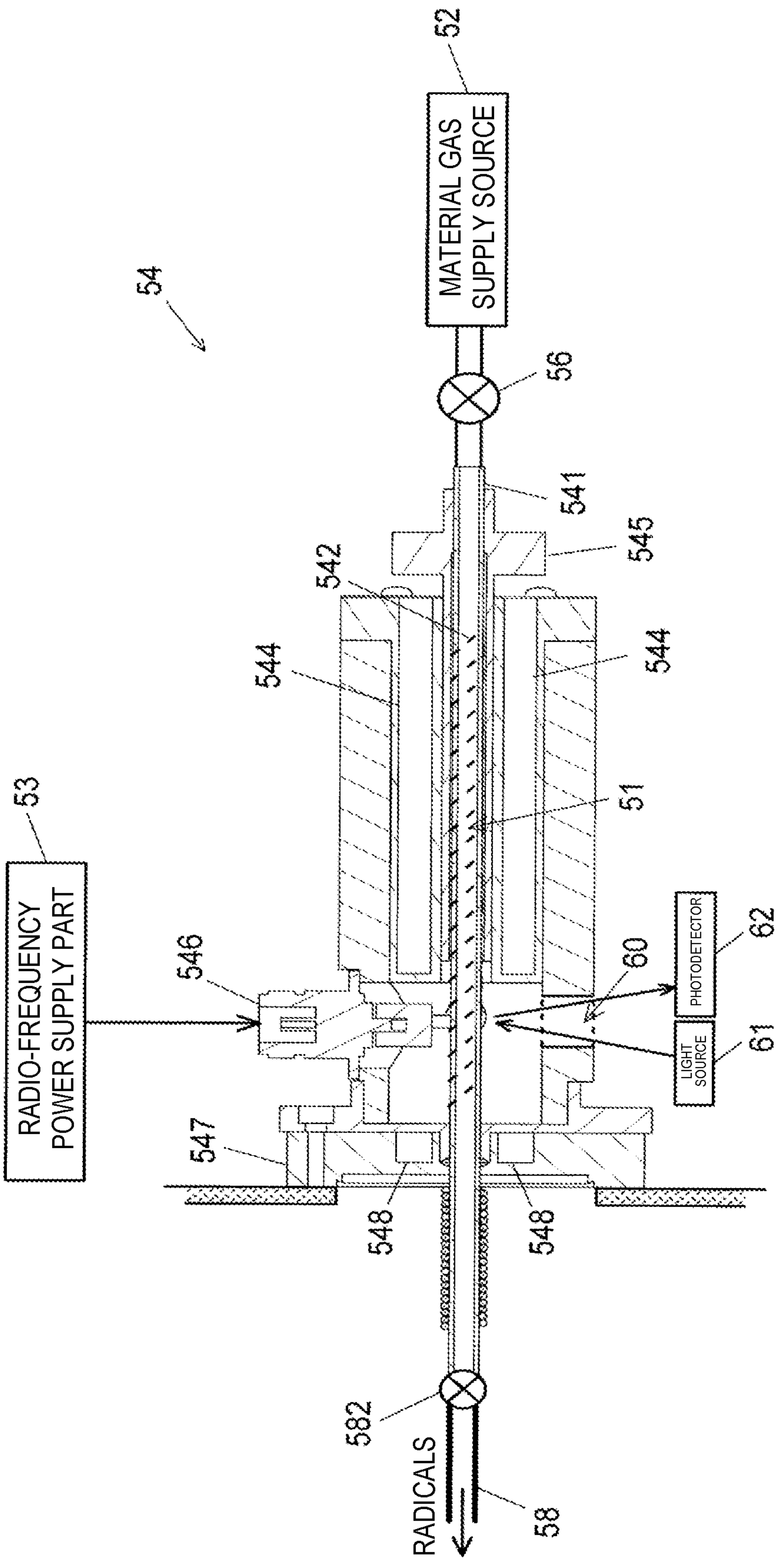
FIG. 2 is a schematic configuration diagram of a radical supply part in the mass spectrometer of the present embodiment.

In addition, a radical supply part 5 is also connected to the collision cell 132. As illustrated in FIGS. 1 and 2, the radical supply part 5 includes a radical source 54 in which a radical generation chamber 51 is formed inside, a vacuum pump (not illustrated) that exhausts the radical generation chamber 51, a material gas supply source 52 that supplies gas (material gas) as a material of radicals, and a radio-frequency power supply part 53. A valve 56 for adjusting a flow rate of the material gas is provided in a flow path from the material gas supply source 52 to the radical generation chamber 51.

The radical source 54 has a tubular body 541 made of a dielectric material. An internal space of the tubular body 541 serves as the radical generation chamber 51. A plunger 545 fixes the tubular body 541 in a state in which the tubular body 541 is inserted into a hollow cylindrical magnet 544. A helical antenna 542 (broken line in FIG. 2) is wound around the outer periphery of a portion located inside the magnet 544 of the tubular body 541.

In addition, the radical source 54 is provided with a radio-frequency power input part 546. The radio-frequency power supply part 53 supplies radio-frequency power to the radio-frequency power input part 546. The radical source 54 further includes a flange 547 for fixing a tip portion of the radical source 54. The flange 547 accommodates a hollow cylindrical magnet 548 having the same diameter as the magnet 544 and forming a pair with the magnet 544. The magnets 544 and 548 generate a magnetic field inside the tubular body 541 (radical generation chamber 51) to easily generate and maintain plasma by the action. The radio-frequency power supplied from the radio-frequency power supply part 53 may be a typical continuous wave, or may be subjected to pulse width modulation (PWM) control. In a case where the PWM-controlled radio-frequency power is supplied, a plasma generation control part 76 (described later) transmits a PWM signal to the radio-frequency power supply part 53, and at the same time, transmits a control signal synchronized with the PWM signal to a light source 61, whereby the supply of the radio-frequency power to the radical generation chamber 51 is synchronized with light emission.

In addition, a light transmission window 60 is provided at a position facing the radical generation chamber 51 of the radical source 54. The light source 61 that emits light having a predetermined wavelength to the tubular body 541 constituting the radical generation chamber 51, and a photodetection part 62 that detects light emitted in the radical generation chamber 51 are disposed outside the light transmission window 60. The photodetection part 62 detects light in a wavelength band including the wavelength of light emitted from plasma. As the photodetection part 62, it is preferable to use one that is not sensitive to the light emitted from the light source 61. As a result, plasma emission can be detected without being affected by the light emitted from the light source 61.

A transport pipe 58 for transporting radicals generated in the radical generation chamber 51 to the collision cell 132 is connected to an outlet end of the radical source 54 via a valve 582. The transport pipe 58 is an insulating pipe, and for example, a quartz glass pipe or a borosilicate glass pipe can be used.

Figure 3:
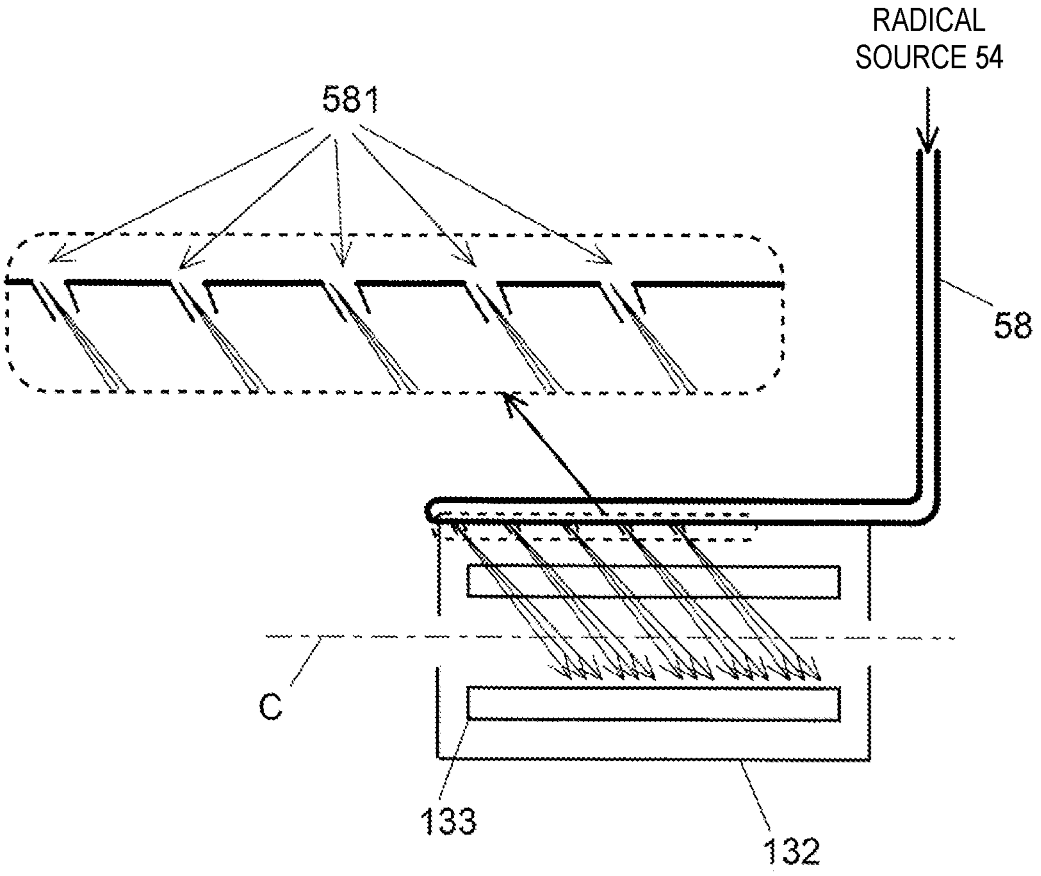
FIG. 3 is a schematic configuration diagram of a radical transport path in the mass spectrometer of the present embodiment.

As illustrated in FIG. 3, in the transport pipe 58, a plurality of head parts 581 are provided in a portion disposed along a wall surface of the collision cell 132. Each head part 581 is provided with an inclined cone-shaped irradiation port configured to emit the radicals in a direction intersecting the central axis (ion optical axis C) of a flight direction of ions. As a result, ions flying inside the collision cell 132 can be uniformly irradiated with the radicals.

The analysis chamber 14 includes: an ion transport electrode 141 for transporting the incident ions from the third intermediate vacuum chamber 13; an orthogonal acceleration electrode 142 including a pair of an expulsion electrode 1421 and a lead-in electrode 1422 disposed in such a manner as to face each other across the incident optical axis of the ions (an orthogonal acceleration area); an acceleration electrode 143 for accelerating the ions ejected to a flight space by the orthogonal acceleration electrode 142; a reflectron electrode 144 for forming a return path for the ions within the flight space; an ion detector 145; and a flight tube 146 configured to define the periphery of the flight space. The ion detector 145 is, for example, an electron multiplier or a multi-channel plate.

The control/processing part 7 controls operations of each part and has a function of storing and analyzing data obtained by the ion detector 145. The control/processing part 7 includes a storage part 71 and a clocking part 72. The storage part 71 stores a compound database 711 and a radical information database 712. The compound database 711 stores information such as measurement conditions (retention times, mass-to-charge ratios of precursor ions, radical species for irradiation at the time of analysis of the sample) and product ion spectra of known compounds.

In addition, the radical information database 712 stores, for each radical species, information such as the type of the material gas used for generating the radical, the flow rate of the material gas, and the magnitude of the radio-frequency power. For the flow rate of the material gas and the magnitude of the radio-frequency power, two kinds of plasma generation conditions (a first plasma generation condition and a second plasma generation condition) are prepared, and are stored together with information of a reference time for properly using them. The first plasma generation condition is used when a time equal to or longer than the reference time has elapsed since the previous radical generation, and when the plasma does not light under the second plasma generation condition described later. The second plasma generation condition is used when the elapsed time from the previous radical generation is shorter than the reference time. In the second plasma generation condition, the flow rate of the material gas and/or the magnitude of the radio-frequency power are set to values smaller than those in the first plasma generation condition. Furthermore, a threshold for the detection intensity of the photodetection part 62 is stored. This threshold is used to determine whether the plasma is lighting or not. The threshold may be a value common to both the case of lighting the plasma using the first plasma generation condition and the case of lighting the plasma using the second plasma generation condition, or may be a different value for each generation condition. The storage part 71 also stores a method file describing measurement conditions when measurement to be described later is performed, and information for converting a time of flight of an ion into a mass-to-charge ratio of the ion.

Some of the radicals generated in the radical generation chamber 51 remain in the radical generation chamber 51 and gradually disappear with the lapse of time. When the material gas is introduced in a state where some radicals remain in the radical generation chamber 51, molecules of the material gas are excited by contact with the radicals to be easily radicalized. Therefore, radicals can be generated from the material gas even if the flow rate of the material gas and/or the radio-frequency power is reduced to be small as compared with a case where no radicals are present in the radical generation chamber 51. The above reference time corresponds to a time during which the radicals can be regarded as remaining in the radical generation chamber 51. In a case where the elapsed time from the previous radical generation is shorter than the reference time, the consumption of the material gas and the power can be reduced by reducing the flow rate of the material gas and/or the supply amount of the radio-frequency power. Since the time during which the radicals remain in the radical generation chamber 51, and the flow rate of the material gas and the magnitude of the radio-frequency power required for the radical generation depend on the volume and structure of the radical generation chamber 51, specific values of the length of the reference time, and the flow rate of the material gas and the magnitude of the radio-frequency power under the first plasma generation condition and the second plasma generation condition may be set for each device by performing preliminary experiments or simulations.

The control/processing part 7 further includes, as functional blocks, a measurement condition setting part 73, a measurement control part 74, a determination part 75, a plasma generation control part 76, a plasma detection part 77, and a warning output part 78. The entity of the control/processing part 7 is a general personal computer to which an input part 8 and a display part 9 are connected, and embodies the functional blocks described above by a processor executing a mass analysis program installed in advance.

Figure 4:
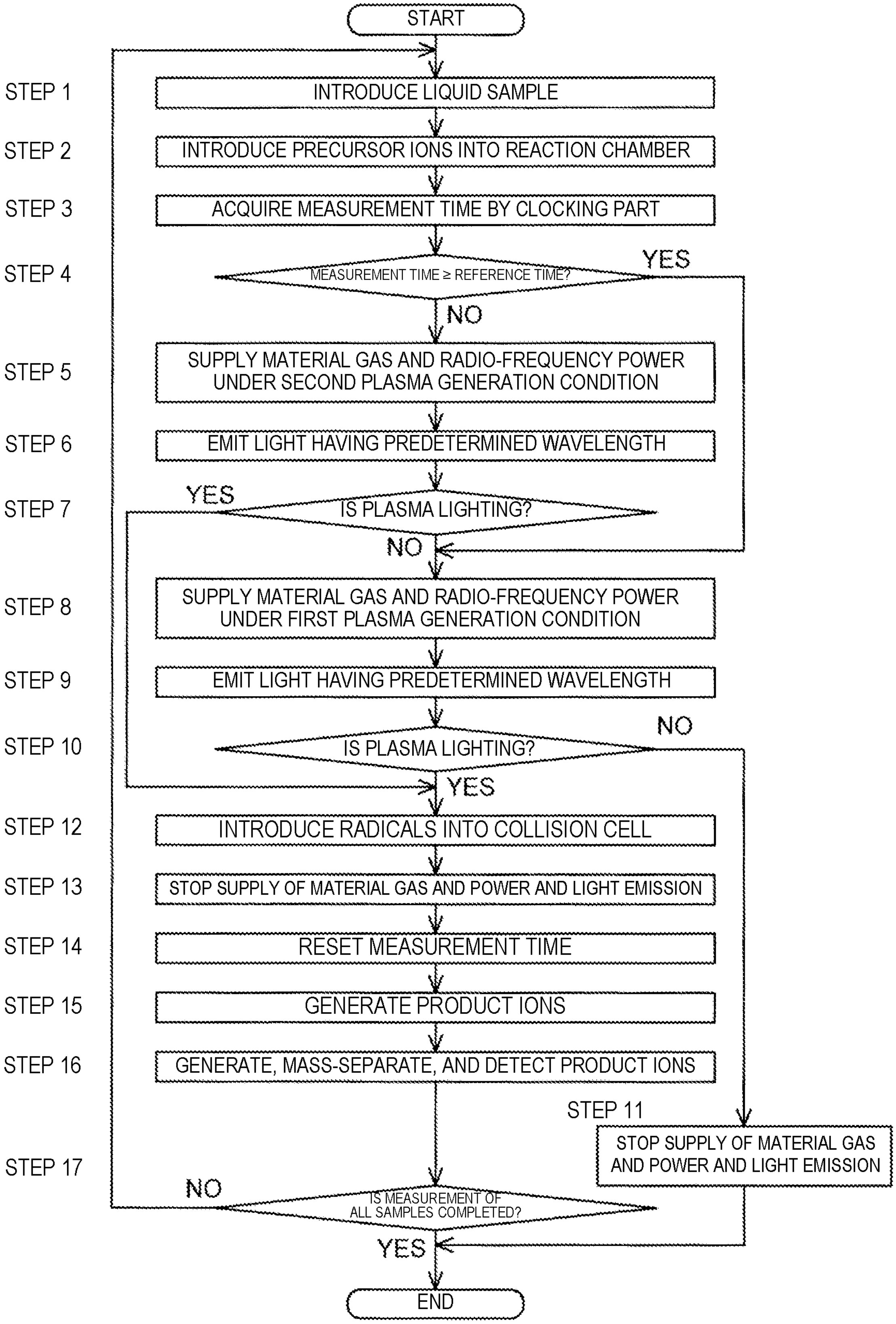
FIG. 4 is a flowchart showing a procedure of an embodiment of a mass spectrometry method according to the present invention.

Next, a procedure for an analysis using the liquid chromatograph mass spectrometer 100 of the present embodiment will be described as an example of the mass spectrometry method according to the present invention. FIG. 4 is a flowchart showing the procedure of the analysis. In this example, a target component contained in each of a plurality of liquid samples is measured. In addition, it is assumed that several days have elapsed since the previous liquid sample measurement.

When a user gives an instruction to start an analysis by a predetermined input operation, the measurement condition setting part 73 displays the compounds stored in the compound database 711 on a screen of the display part 9, and allows the user to specify a target compound to be measured. When the user specifies the target compound, the measurement condition setting part 73 reads the measurement conditions of this compound from the compound database 711, and creates a batch file for executing continuous measurement of the plurality of liquid samples.

When the user gives an instruction to start the measurement by a predetermined input operation after the creation of the batch file, the measurement control part 74 sequentially measures the plurality of liquid samples according to the measurement conditions described in the batch file.

The measurement control part 74 operates the vacuum pump prior to the measurement to exhaust the inside of the radical generation chamber 51 to a predetermined degree of vacuum.

Next, the measurement control part 74 introduces, into the injector 22, a liquid sample set at a predetermined position among the plurality of liquid samples set in the autosampler 24 by the user in advance, as a first measurement sample (step 1). The liquid sample is introduced into the column 23 along a mobile phase flow fed from the mobile phase container 20 by the liquid feeding pump 21. After components contained in the liquid sample are temporally separated in the column 23, the separated components are sequentially introduced into the electrospray ionization probe 101.

Ions of the target compound generated in the electrospray ionization probe 101 are drawn into the first intermediate vacuum chamber 11 through the heated capillary 102 by a pressure difference between the ionization chamber 10 and the first intermediate vacuum chamber 11. In the first intermediate vacuum chamber 11, the ion lens 111 focuses the ions in the vicinity of the ion optical axis C.

The ions focused in the first intermediate vacuum chamber 11 subsequently enter the second intermediate vacuum chamber 12, are again focused in the vicinity of the ion optical axis C by the ion guide 121, and then enter the third intermediate vacuum chamber 13.

In the third intermediate vacuum chamber 13, the quadrupole mass filter 131 selects precursor ions from the ions generated from the target compound. The precursor ions that have passed through the quadrupole mass filter 131 are introduced into the collision cell 132 (step 2).

At a predetermined time (for example, 1 minute) before a time (retention time) during which the target compound flows out of the column 23 after the start of the measurement, the determination part 75 acquires information on a measurement time by the clocking part 72 (step 3). At this point in time, the first liquid sample is being measured, and no information on a measurement time is acquired (alternatively, a sufficiently long time of several days has elapsed since the radical generation in the previous analysis). Therefore, the determination part 75 determines that the elapsed time exceeds the reference time (for example, 1 hour) (YES in step 4).

When the determination part 75 determines that a time equal to or longer than the reference time has elapsed since the last plasma generation (YES in step 4), the plasma generation control part 76 transmits a control signal for setting the first plasma generation condition to the material gas supply source 52 and the radio-frequency power supply part 53. In response to this, the material gas supply source 52 introduces a material gas into the radical generation chamber 51, and the radio-frequency power supply part 53 supplies a radio-frequency voltage to the helical antenna 542 on the basis of the first plasma generation condition (step 8). Subsequently, in a state where the radio-frequency power is supplied to the material gas in the radical generation chamber 51, the plasma generation control part 76 also transmits a control signal to the light source 61, and the light source 61 emits light having a predetermined wavelength into the radical generation chamber 51 (step 9). As described above, the radio-frequency power applied from the radio-frequency power supply part 53 to the helical antenna 542 may be a continuous wave, or may be subjected to pulse width modulation (PWM) control. In a case where the PWM-controlled radio-frequency power is supplied, the ON time of the light source is limited only to a timing required for necessary discharge by synchronizing turning ON/OFF of the light source with the PWM signal, which offers an advantage that the life of the light source can be prolonged and a temperature rise in the light source can be suppressed. Similarly, in a case where the radio-frequency power is supplied on the basis of the second plasma generation condition (described later), the pulse-width modulated power can be used.

The wavelength of the light emitted into the radical generation chamber 51 is determined according to a material forming the radical generation chamber 51. For example, in a case where the tubular body 541 made of quartz is used, light having a wavelength of 275 nm or less is applied. As a result, electrons are emitted from a wall surface of the tubular body 541 constituting the radical generation chamber 51. The electrons induce plasma emission.

After transmitting the control signal to each of the above parts, the plasma generation control part 76 also transmits a control signal to the photodetection part 62 to detect the plasma emission generated in the radical generation chamber 51. Output signals from the photodetection part 62 are sequentially stored in the storage part 71.

When the plasma generation control part 76 transmits the control signal to the photodetection part 62, the plasma detection part 77 determines whether the plasma is lighting or not on the basis of whether the detection intensity of the photodetection part 62 exceeds a threshold stored in the storage part 71 (step 10). In a case where the plasma detection part 77 does not determines that the plasma is lighting (the detection intensity of the photodetection part 62 does not reach the threshold) even after a predetermined time (for example, 5 seconds) has elapsed since the transmission of the control signal to the photodetection part 62 from the plasma generation control part 76 (NO in step 10), all of the power supply from the radio-frequency power supply part 53, the supply of the material gas, and the light emission from the light source 61 are stopped (step 11), and the measurement is terminated. In addition, the warning output part 78 displays a screen for reporting an error on the display part 9. The output of the warning is not limited to screen display, and may be voice output, or both screen display and voice output.

In a case where the plasma detection part 77 determines that the plasma is lighting (the detection intensity of the photodetection part 62 reaches the threshold) (YES in step 10), the measurement is continued. Radicals generated by the supply of the material gas and the radio-frequency power and the light emission are introduced into the collision cell 132 through the transport pipe 58 (step 12).

When a predetermined time (for example, 1 minute) has elapsed from the retention time of the target compound, the plasma generation control part 76 stops the supply of the material gas, the input of the radio-frequency power, and the light emission (step 13). As a result, the plasma disappears, and the generation and supply of the radicals are stopped. The predetermined time may be appropriately determined in consideration of the length of the retention time (time during which the target compound flows out of the column 23) of the target compound, and may be described in the method file.

At the same time as the supply of the material gas, the input of the radio-frequency power, and the light emission are stopped, a predetermined signal is also transmitted to the clocking part 72 to reset the elapsed time measured in the clocking part 72 (step 14).

In the collision cell 132, the precursor ions are dissociated by the radical attachment reaction to generate product ions (step 15). The product ions generated in the collision cell 132 are focused in the vicinity of the ion optical axis C by the ion guide 134, and then enter the analysis chamber 14.

The ion transport electrode 141 transports the product ions having entered the analysis chamber 14 to the orthogonal acceleration electrode 142. A voltage is applied to the orthogonal acceleration electrode 142 at a predetermined cycle to deflect the flight direction of the ions in a direction substantially orthogonal to the previous direction. The ions with the deflected flight direction are accelerated by the acceleration electrode 143, and ejected to the flight space. The ions ejected to the flight space fly along a predetermined flight path defined by the reflectron electrode 144 and the flight tube 146 for a time corresponding to the mass-to-charge ratio of each ion, to be separated from each other and detected by the ion detector 145 (step 16). The ion detector 145 outputs a signal having a magnitude corresponding to the incident amount of the ion every time the ion is incident. The output signals from the ion detector 145 are sequentially stored in the storage part 71. The storage part 71 stores measurement data with the time of flight of the ion and the detection intensity of the ion as axes.

When the measurement of the first liquid sample is completed, the measurement control part 74 checks whether the measurement of all the liquid samples is completed (step 17). Here, since only the first liquid sample has been measured, it is determined that the measurement of all the liquid samples has not been completed (NO in step 17). The process returns to step 1, in which the next liquid sample is introduced from the autosampler 24 into the injector 22, and precursor ions are introduced into the collision cell 132 (step 2). Since conditions other than the radical generation condition are the same as those in the measurement of the first liquid sample, only differences from the measurement of the first liquid sample will be described.

At a predetermined time (for example, 1 minute) before a time (retention time) during which the target compound flows out of the column 23 after the start of the measurement of the second liquid sample, the determination part 75 acquires information on a measurement time by the clocking part 72 again (step 3). Unlike the measurement of the first liquid sample, the elapsed time from the last plasma generation is short (for example, about 15 minutes). Therefore, the determination part 75 determines that the elapsed time is shorter than the reference time (for example, 1 hour) (NO in step 4).

When the determination part 75 determines that the elapsed time is shorter than the reference time (NO in step 4), the plasma generation control part 76 introduces a material gas from the material gas supply source 52 into the radical generation chamber 51, and supplies a radio-frequency voltage from the radio-frequency power supply part 53 to the helical antenna 542 on the basis of the second plasma generation condition (step 5). Subsequently, in a state where the radio-frequency power is supplied to the material gas in the radical generation chamber 51, the light source 61 emits light having a predetermined wavelength into the radical generation chamber 51 (step 6). As a result, electrons are emitted from the wall surface of the tubular body 541 constituting the radical generation chamber 51 as in the previous measurement. The electrons induce plasma.

After transmitting the control signal to each of the above parts, the plasma generation control part 76 also transmits a control signal to the photodetection part 62 to detect the plasma emission generated in the radical generation chamber 51. Output signals from the photodetection part 62 are sequentially stored in the storage part 71.

When the plasma generation control part 76 transmits the control signal to the photodetection part 62, the plasma detection part 77 determines whether the plasma is lighting or not on the basis of whether the detection intensity of the photodetection part 62 exceeds a threshold stored in the storage part 71 (step 7).

In a case where the plasma detection part 77 does not determine that the plasma is lighting even after a predetermined time (for example, 5 seconds) has elapsed since the transmission of the control signal to the photodetection part 62 from the plasma generation control part 76 (NO in step 7), the plasma generation control part 76 introduces the material gas from the material gas supply source 52 into the radical generation chamber 51, and supplies the radio-frequency voltage from the radio-frequency power supply part 53 to the helical antenna 542 on the basis of the first plasma generation condition (step 8). Subsequently, in a state where the radio-frequency power is supplied to the material gas in the radical generation chamber 51, the light source 61 emits light having a predetermined wavelength into the radical generation chamber 51 (step 9). This light emission may be continued as it is from the light emission in step 6 described above. By this light emission, electrons are emitted from the wall surface of the tubular body 541 constituting the radical generation chamber 51 as in the previous measurement, and induce plasma again.

After that, the plasma detection part 77 again determines whether the plasma is lighting or not on the basis of whether the detection intensity of the photodetection part 62 exceeds the threshold stored in the storage part 71 (step 10). In a case where the plasma detection part 77 does not determine that the plasma is lighting even after a predetermined time (for example, 5 seconds) has elapsed since the transmission of the control signal to the photodetection part 62 from the plasma generation control part 76 (NO in step 10), the plasma generation control part 76 stops all of the power supply from the radio-frequency power supply part 53, the supply of the material gas, and the light emission from the light source 61 (step 11), and terminates the measurement. In addition, the warning output part 78 displays a screen for reporting an error on the display part 9.

In a case where the plasma detection part 77 determines that the plasma is lighting (YES in step 7, or YES in step 10), the measurement is continued. Radicals generated by the supply of the material gas and the radio-frequency power and the light emission are introduced into the collision cell 132 through the transport pipe 58 (step 12).

When a predetermined time (for example, 1 minute) has elapsed from the retention time of the target compound, the plasma generation control part 76 stops the supply of the material gas, the input of the radio-frequency power, and the light emission. As a result, the plasma disappears, and the generation and supply of the radicals are stopped (step 13). The predetermined time may be appropriately determined in consideration of the length of the retention time (time during which the target compound flows out of the column 23) of the target compound, and may be described in the method file. Basically, the predetermined time in the case of using the first plasma generation condition and the predetermined time in the case of using the second plasma condition may be the same.

At the same time as the supply of the material gas, the input of the radio-frequency power, and the light emission are stopped, a predetermined signal is also transmitted to the clocking part 72 to reset the elapsed time measured in the clocking part 72 (step 14).

In the collision cell 132, product ions are generated from the precursor ions by irradiation with the radicals (step 15). The product ions are detected after the mass separation in the same manner as described above (step 16). The liquid samples are sequentially measured as described above. When the measurement of all the liquid samples is completed (YES in step 17), the series of measurement is terminated.

In a conventional mass spectrometer, plasma is generated only by supplying a material gas and inputting radio-frequency power, and plasma is not necessarily generated at a fixed timing in some cases. Therefore, it is necessary to generate radicals in the radical supply part 5 before starting analysis. This causes a problem in that the consumption of the material gas and the radio-frequency power increases.

On the other hand, in the mass spectrometer of the present embodiment, the light source 61 emits light having a predetermined wavelength to the tubular body 541 to emit electrons into the radical generation chamber 51. When the material gas is supplied and the radio-frequency power is input, the electrons induce plasma emission to immediately generate radicals from the material gas irradiated with the plasma emission. Therefore, the plasma only needs to be generated immediately before the retention time of the target compound, and the use amount of the material gas and the radio-frequency power can be reduced. In addition, it is possible to more reliably generate the plasma and generate the radicals at a desired timing as compared with a conventional configuration in which the light emission is not performed.

Furthermore, in the mass spectrometer of the present embodiment, in a case where the elapsed time from the last plasma generation is shorter than the reference time, the plasma is generated with the reduced supply amount of the material gas and/or the reduced input amount of the radio-frequency power. This also makes it possible to reduce the use amount of the material gas and the radio-frequency power.

Not all the gas molecules contained in the material gas supplied to the radical generation chamber 51 are radicalized, and a large number of neutral molecules remain. The remaining neutral molecules flowing into the collision cell 132 causes a decrease in the degree of vacuum of the collision cell 132 and the third intermediate vacuum chamber 13. In the present embodiment, the material gas only needs to be supplied in a minimum amount at a necessary timing, which makes it possible to reduce the decrease in the degree of vacuum of the collision cell 132 and the third intermediate vacuum chamber 13.

As a method of supplying electrons to a plasma generation space, for example, it is also conceivable to emit electrons from a filament to the plasma generation space. However, when a foreign substance such as a filament is disposed in a plasma generation chamber in the case of generating radicals as in the present embodiment, there is a possibility that an undesired substance is generated or the inside of the plasma generation chamber is contaminated to cause an unexpected chemical reaction in precursor ions. On the other hand, in the above embodiment, since the electrons are emitted from the material itself forming the radical generation chamber 51, the above-described concern does not arise.

Next, the effects of the present invention will be confirmed, and the result of an experiment for investigating the reference time, the first plasma generation condition, and the second plasma generation condition in the above embodiment will be described.

In this experiment, three different light emission conditions were used, water vapor was used as the material gas, and inductively coupled plasma was generated to generate oxygen radicals three times each. Specifically, the light emission conditions are no light emission (Comparative Example), light emission at a wavelength of 275 nm (First Example), and light emission at a wavelength of 250 nm (Second Example). The wavelength of light emitted in First and Second Examples was determined with reference to a maximum value (255 nm) of the wavelength of light capable of emitting electrons by photoelectric effect, the maximum value being determined from a work function of quartz (4.85 eV, see Non Patent Literature 2) as the material forming the radical generation chamber. The light was emitted from an LED light source for emitting light in a wavelength band centered on the above wavelength. In addition, plasma generation was confirmed by plasma emission (lighting of visible light). The first plasma generation was performed at least 2 hours after the completion of the previous plasma generation (turning off of plasma), and the second radical generation and the third radical generation were each performed 1 hour after the last turning off of plasma.

The magnitude of energy required to extract electrons from a target substance to infinity is called a work function. Work functions of various substances are directly measured using ultraviolet photoelectron spectroscopy, X-ray photoelectron spectroscopy, Auger electron spectroscopy, or the like, or indirectly measured by a contact potential difference method. For example, Non Patent Literature 4 reports that the work function of gold is about 5.1 eV and the work function of nickel is about 4.6 eV by measurement using Auger electron spectroscopy. In addition, Non Patent Literature 2 reports that when glass ($SiO_2$) is brought into contact with gold, the glass ($SiO_2$) is charged positively, and when glass is brought into contact with nickel, the glass is charged negatively. That is, the work function of glass ($SiO_2$) has a value between the work function of gold and the work function of nickel. Therefore, when glass ($SiO_2$) is irradiated with light in a wavelength band including a wavelength between a wavelength (243 nm) corresponding to the work function of gold and a wavelength (269 nm) corresponding to the work function of nickel, an electron can be extracted.

In each measurement, a microwave having a frequency of 2459 MHz was supplied from a microwave power source to the antenna at an output of 23 W, and the flow rate of water vapor at which the plasma lit (that is, the minimum flow rate of water vapor required to light the plasma by supplying the above microwave) by gradually increasing the flow rate from 0 was measured. Specifically, the flow rate was changed stepwise by a procedure in which the flow rate was first set to 0 standard cubic centimeter per minute (sccm) by a mass flow controller (MFC), the flow rate was increased in a case where the plasma had not lit within 3 seconds, and the flow rate was further increased in a case where the plasma had not lit within another 3 seconds, and the flow rate when the plasma lit was obtained. In addition, in a case where the plasma did not light even when the flow rate was increased to the maximum (2.0 sccm), it was determined that there was no data (the plasma did not light) for this time.

FIG. 5 shows a measurement result. In the first measurement of Comparative Example, the plasma did not light even when the flow rate of water vapor was maximized (the value of MFC was 2.0 sccm). Therefore, light having a wavelength of 275 nm was emitted to temporarily light the plasma, and then the second and subsequent measurements were performed. In the second and third measurements in Comparative Example, the plasma lit when the flow rate was increased to 0.5 sccm and 0.32 sccm, respectively.

In both First and Second Examples, the plasma lit from the first time. The flow rates of water vapor at the time of the first, second, and third plasma lightings in First Example were 0.24 sccm, 0.1 sccm, and 0.2 sccm, respectively. In addition, the flow rates of water vapor at the time of the first, second, and third plasma lightings in Second Example were 0.32 sccm, 0.1 sccm, and 0.2 sccm, respectively.

In both First and Second Examples, it can be seen that the plasma lit at the time when water vapor having a flow rate lower than that in Comparative Example was supplied, and the plasma lighting was induced by light emission. In addition, in both First and Second Examples, the plasma lit at the time when water vapor having a lower flow rate was supplied in the second and third plasma lightings as compared with the flow rate of water vapor in the first plasma lighting. From this result, it can be said that the plasma can be lit with the reduced flow rate of water vapor until a certain time elapses from the last plasma lighting. This is considered to be because chemically unstable substances generated in the first plasma lighting remain in the radical generation chamber to induce the plasma. Therefore, not only the flow rate of the material gas can be reduced as in this experiment, but the power consumption can also be reduced.

The wavelength of light emitted in the above embodiment is set on the premise that electrons are emitted from quartz. However, in a case where the radical generation chamber is configured using a different dielectric material (for example, aluminum oxide, aluminum nitride), the wavelength may be determined with reference to a maximum value of the wavelength of light capable of emitting electrons by photoelectric effect, the maximum value being determined from the work function of this material in the same manner as described above. For example, the work function of aluminum oxide is 4.7 eV. Thus, light having a central wavelength around a wavelength of 264 nm may be emitted. In addition, the work function of aluminum nitride is 3.29 eV (see Non Patent Literature 3). Thus, light having a center wavelength around 376 nm may be emitted.

Each of the numerical values obtained in the above experiment depends on the configuration of the device used in the experiment (for example, the volume of the radical generation chamber). The reference time and the flow rate of the material gas (the first plasma generation condition and the second plasma generation condition) can be similarly determined for a device having a given configuration by performing a preliminary experiment or the like.

The above-described embodiment and experimental result are merely an example, and can be appropriately modified in accordance with the spirit of the present invention. Although the liquid chromatograph mass spectrometer is used in the above embodiment, a gas chromatograph mass spectrometer may be used. Alternatively, only a mass spectrometer may be used without using a chromatograph. In the above embodiment, the quadrupole-orthogonal acceleration time-of-flight mass spectrometer is used. However, a triple quadrupole mass spectrometer, an ion trap mass spectrometer, or the like can be used.

Although oxygen radicals are generated from water vapor in the above experiment, oxygen radicals can be similarly generated by using an oxygen gas or an ozone gas as the material gas. In addition to the oxygen radicals, the precursor ions may be irradiated with hydrogen radicals, hydroxy radicals, nitrogen radicals, methyl radicals, chlorine radicals, fluorine radicals, phosphate radicals, silicon radicals, or the like. As the material gas capable of generating such radicals, for example, a hydrogen gas capable of generating the hydrogen radicals, water vapor capable of generating the hydrogen radicals, the oxygen radicals, and the hydroxy radicals, a nitrogen gas capable of generating the nitrogen radicals, a methyl gas capable of generating the methyl radicals, a chlorine gas capable of generating the chlorine radicals, a fluorine gas capable of generating the fluorine radicals, phosphate vapor capable of generating the phosphate radicals, or a silane gas capable of generating the silicon radicals can be used. The reference time, the first plasma generation condition, and the second plasma generation condition when each material gas is used may be determined in advance by performing a preliminary experiment or the like.

In the above embodiment, the predetermined signal is transmitted to the clocking part 72 to reset the elapsed time measured in the clocking part 72 at the same time as the supply of the material gas and the radio-frequency power is stopped. However, the elapsed time measured in the clocking part 72 may be reset at the time when the plasma detection part 77 detects that the plasma is turned off on the basis of the detection intensity of the photodetection part 62 falling below the threshold. Any configuration can be used in a case where the plasma lighting time for each measurement is fixed. On the other hand, in a case where the length of the plasma lighting time is different for each measurement, the latter configuration (configuration in which the elapsed time is reset at the timing of plasma turning off) may be adopted.

In the above embodiment, the measurement is terminated in a case where the plasma does not light even under the first plasma generation condition. However, a third plasma generation condition in which at least one of the flow rate of the material gas and/or the magnitude of the radio-frequency power is larger than that under the first plasma generation condition may be set in advance, and the plasma may be lit using the third plasma generation condition in a case where the plasma does not light under the first plasma generation condition. Alternatively, in a case where the plasma does not light under the first plasma generation condition, the user may change at least one of the flow rate of the material gas and/or the magnitude of the radio-frequency power.

[Modes]

It is understood by those skilled in the art that the plurality of exemplary embodiments described above are specific examples of the following modes.

(Clause 1)

A mass spectrometry method according to one mode includes:

- a step of introducing a precursor ion into a reaction chamber;
- a step of generating a radical in a radical generation chamber;
- a step of generating a product ion by irradiating the precursor ion in the reaction chamber with the radical; and
- a step of measuring a mass of the product ion, the step of generating a radical including:
- a step of introducing a material gas into the radical generation chamber;
- a step of supplying radio-frequency power to the material gas simultaneously with or after introducing the precursor ion into the reaction chamber; and
- a step of supplying an electron to the material gas in a state where the radio-frequency power is supplied to generate plasma emission, and irradiating the material gas with the plasma emission to generate the radical.

(Clause 4)

A mass spectrometer according to one mode includes:

- a reaction chamber into which a precursor ion is introduced;
- a radical generation chamber;
- a material gas supply part configured to supply a material gas into the radical generation chamber;
- a radio-frequency power supply part configured to supply radio-frequency power for generating plasma inside the radical generation chamber;
- an electron supply part configured to supply an electron into the radical generation chamber; and
- a control part configured to control operations of the material gas supply part, the radio-frequency power supply part, and the electron supply part so as to supply the material gas to the radical generation chamber, supply the radio-frequency power simultaneously with or after introducing the precursor ion into the reaction chamber, and supply the electron from the electron supply part into the radical generation chamber in a state where the radio-frequency power is supplied.

The mass spectrometry method of Clause 1 and the mass spectrometer of Clause 4 are used for irradiating the precursor ion introduced into the reaction chamber with the radical to generate the product ion from the precursor ion. In the mass spectrometry method of Clause 1 and the mass spectrometer of Clause 4, the material gas is supplied into the radical generation chamber, the radio-frequency power is supplied to the material gas in the radical generation chamber, and the electron is further supplied to generate the plasma emission in the radical generation chamber. When the electron is supplied to the material gas inside the radical generation chamber, the plasma is generated by being induced by the electron. In the mass spectrometry method of Clause 1 and the mass spectrometer of Clause 4, the plasma emission is generated in accordance with the timing at which the precursor ion is introduced into the reaction chamber to generate the radical. This makes it possible to reduce the consumption of the material gas and the power. In addition, by emitting light having a predetermined wavelength as described above into the radical generation chamber at a desired timing of generating the plasma, the timing of generating the plasma of the material gas can be controlled. Supplying the radio-frequency power to the material gas simultaneously with or after introducing the precursor ion into the reaction chamber as described above means that the radio-frequency power is in a state of being supplied to the material gas simultaneously with or after the introduction of the precursor ion into the reaction chamber, and does not exclude starting of the state of supplying the radio-frequency power at a predetermined time before the timing at which the precursor ion is introduced (for example, the retention time of the target compound contained in the sample).

(Clause 2)

In the mass spectrometry method according to Clause 1,

- the supply of at least one of the material gas and the radio-frequency power is stopped after a lapse of a predetermined time from a start of the generation of the radical.

In the mass spectrometry method of Clause 2, since the material gas and/or the radio-frequency power are supplied only within a time period in which radical irradiation is required, the consumption of at least one of the material gas and the radio-frequency power can be reduced.

(Clause 3)

In a mass spectrometry method according to Clause 1 or 2,

- the electron is generated by irradiating a material forming the radical generation chamber with light having a wavelength for generating the electron.

(Clause 8)

In a mass spectrometer according to any of Clauses 4 to 7,

- the electron supply part is a light emission part configured to emit light having a predetermined wavelength according to a material forming the radical generation chamber.

When the plasma is generated, for example, a tubular body made of quartz is used, and the inside of the tubular body is used as the radical generation chamber. In the mass spectrometry method of Clause 3 and the mass spectrometer of Clause 8, the electron is emitted by irradiating the material (for example, quartz) forming an inner wall of the radical generation chamber with deep ultraviolet light. The electron can also be emitted from a filament into a plasma generation space, for example. However, when a foreign substance such as a filament is disposed in a plasma generation chamber, there is a possibility that an undesired substance is generated or the inside of the plasma generation chamber is contaminated to cause an unexpected chemical reaction in precursor ions. In the mass spectrometry method of Clause 3 and the mass spectrometer of Clause 8, since the electron is emitted from the material itself forming the radical generation chamber, the above-described concern does not arise.

(Clause 5)

The mass spectrometer according to Clause 4 further includes:

a storage part configured to store information on a first plasma generation condition including a material gas flow rate and a radio-frequency power magnitude, a second plasma generation condition under which at least one of the material gas flow rate and the radio-frequency power magnitude is smaller than the first plasma generation condition, and a reference time;

a clocking part configured to measure an elapsed time from last plasma generation in the radical generation chamber; and a plasma generation control part configured to generate plasma under the first plasma generation condition in a case where the elapsed time is equal to or longer than a predetermined reference time, and generate plasma under the second plasma generation condition in a case where the elapsed time is shorter than the reference time.

When the plasma is generated in the radical generation chamber, various substances are generated in a chemical state. Therefore, in a case where the elapsed time from the plasma generation is short, the plasma is easily induced by these substances as well. In the mass spectrometer of Clause 5, a residence time of these substances and conditions under which the plasma can be generated in the presence of these substances are estimated by performing preliminary measurement or the like. This makes it possible to reduce the consumption of the material gas and the power consumption in the plasma generation in a case where the elapsed time from the last plasma generation is shorter than the reference time.

(Clause 6)

The mass spectrometer according to Clause 4 or 5, further includes a photodetection part configured to detect light emitted from the plasma in the radical generation chamber.

When the plasma is not generated and the radical is not generated during the measurement, no radical attachment reaction occurs in the precursor ion and a correct result cannot be obtained. In the mass spectrometer of Clause 6, a warning is output in a case where the plasma is not generated. Therefore, a user can be easily informed that abnormality occurs in the measurement.

(Clause 7)

The mass spectrometer according to Clause 6, further includes:

a plasma detection part configured to detect plasma generation on the basis of a detection intensity of the photodetection part exceeding a predetermined threshold; and a warning output part configured to output a warning in a case where the plasma generation is not detected after a lapse of a predetermined time from the electron supply to the radical generation chamber.

In the mass spectrometer of Clause 7, the warning output part outputs the warning in a case where the plasma is not detected, so that a user can easily grasp a situation in which the plasma is not generated.

(Clause 9)

In the mass spectrometer according to Clause 6 or 7, the electron supply part is a light emission part configured to emit light having a predetermined wavelength according to a material forming the radical generation chamber, and the photodetection part detects light in a wavelength band not including the predetermined wavelength.

The mass spectrometer of Clause 9 can detect only light emitted from the plasma without being affected by light emitted from the light emission part to the radical generation chamber.

(Clause 10)

In the mass spectrometer according to Clause 8 or 9, the material is quartz, and the predetermined wavelength is 275 nm or less.

In the mass spectrometer of Clause 10, inexpensive and easily available quartz is used as the material forming the radical generation chamber when generating inductively coupled plasma, and the electron is emitted from the quartz by irradiating the quartz with light having a wavelength of 275 nm or less, whereby the plasma can be induced. In a case where the light emitted from the light emission part is not monochromatic light, the center wavelength may be 275 nm.

(Clause 11)

In a mass spectrometer according to any of Clauses 8 to 10, the light emission part includes an LED light source configured to emit light having the predetermined wavelength.

In the mass spectrometer of Clause 11, the radical generation chamber can be irradiated with light in a narrow band with stable intensity.

(Clause 12)

In the mass spectrometer according to any of Clauses 4 to 11, the radical generated from the material gas is any of a hydrogen radical, an oxygen radical, a hydroxy radical, a nitrogen radical, a methyl radical, a chlorine radical, a fluorine radical, a phosphate radical, and a silicon radical.

As in the mass spectrometer of Clause 12, the radical with which the precursor ion is irradiated in the mass spectrometer of any of Clauses 4 to 11 can be any of the hydrogen radical, the oxygen radical, the hydroxy radical, the nitrogen radical, the methyl radical, the chlorine radical, the fluorine radical, the phosphate radical, and the silicon radical. Any of these radicals can be generated from a material gas that is easily available.

REFERENCE SIGNS LIST

100 . . . Liquid Chromatograph Mass Spectrometer
1 . . . Mass Spectrometer
10 . . . Ionization Chamber
101 . . . Electrospray Ionization (ESI) Probe
11 . . . First Intermediate Vacuum Chamber
12 . . . Second Intermediate Vacuum Chamber
13 . . . Third Intermediate Vacuum Chamber
131 . . . Quadrupole Mass Filter
132 . . . Collision Cell
133 . . . Multipole Ion Guide
14 . . . Analysis Chamber
142 . . . Orthogonal Acceleration Electrode
144 . . . Reflectron Electrode
145 . . . Ion Detector
146 . . . Flight Tube
2 . . . Liquid Chromatograph
20 . . . Mobile Phase Container

21 . . . Liquid Feeding Pump
22 . . . Injector
23 . . . Column
24 . . . Autosampler
4 . . . Collision Gas Supply Part
41 . . . Collision Gas Source
42 . . . Gas Introduction Flow Path
5 . . . Radical Supply Part
51 . . . Radical Generation Chamber
52 . . . Material Gas Supply Source
53 . . . Radio-Frequency Power Supply Part
54 . . . Radical Source
541 . . . Tubular Body
542 . . . Helical Antenna
544, 548 . . . Magnet
546 . . . Radio-Frequency Power Input Part
58 . . . Transport Pipe
581 . . . Head Part
582 . . . Valve
60 . . . Light Transmission Window
61 . . . Light Source
62 . . . Photodetection Part
7 . . . Control/Processing Part
71 . . . Storage Part
711 . . . Compound Database
712 . . . Radical Information Database
72 . . . Clocking Part
73 . . . Measurement Condition Setting Part
74 . . . Measurement Control Part
75 . . . Determination Part
76 . . . Plasma Generation Control Part
77 . . . Plasma Detection Part
78 . . . Warning Output Part
8 . . . Input Part
9 . . . Display Part
C . . . Ion Optical Axis

The invention claimed is:

1. A mass spectrometry method comprising:

a step of introducing a precursor ion into a reaction chamber;

a step of generating a radical in a radical generation chamber;

a step of generating a product ion by irradiating the precursor ion in the reaction chamber with the radical; and a step of measuring a mass of the product ion, the step of generating a radical including:

a step of introducing a material gas into the radical generation chamber;

a step of supplying radio-frequency power to the material gas simultaneously with or after introducing the precursor ion into the reaction chamber; and a step of supplying an electron to the material gas in a state where the radio-frequency power is supplied to generate plasma emission, and irradiating the material gas with the plasma emission to generate the radical, wherein the electron is generated by irradiating a material forming an inside of the radical generation chamber with light having a wavelength for generating the electron.

2. The mass spectrometry method according to claim 1, wherein the supply of at least one of the material gas and the radio-frequency power is stopped after a lapse of a predetermined time from a start of the generation of the radical.

3. A mass spectrometer comprising:

a reaction chamber into which a precursor ion is introduced;

a radical generation chamber;

a material gas supply part configured to supply a material gas into the radical generation chamber;

a radio-frequency power supply part configured to supply radio-frequency power for generating plasma inside the radical generation chamber; and an electron supply part configured to into the radical generation chamber; and an electron supply part configured to supply an electron into the radical generation chamber; and a photodetection part configured to detect light emitted from the plasma in the radical generation chamber.

4. The mass spectrometer according to claim 3, wherein the electron supply part is a light emission part configured to emit light having a predetermined wavelength according to a material forming the radical generation chamber.

5. The mass spectrometer according to claim 4, wherein the material is quartz, and the predetermined wavelength is 275 nm or less.

6. The mass spectrometer according to claim 4, wherein the light emission part includes an LED light source configured to emit light having the predetermined wavelength.

7. The mass spectrometer according to claim 3, wherein the electron supply part is a light emission part configured to emit light having a predetermined wavelength according to a material forming the radical generation chamber, and the photodetection part detects light in a wavelength band not including the predetermined wavelength.

8. The mass spectrometer according to claim 3, wherein the radical generated from the material gas is any of a hydrogen radical, an oxygen radical, a hydroxy radical, a nitrogen radical, a methyl radical, a chlorine radical, a fluorine radical, a phosphate radical, and a silicon radical.

* * * * *